Aug. 15, 1944.　　　A. G. MAHLER　　　2,356,072
GROUND PULVERIZER
Filed May 22, 1943　　　2 Sheets-Sheet 2
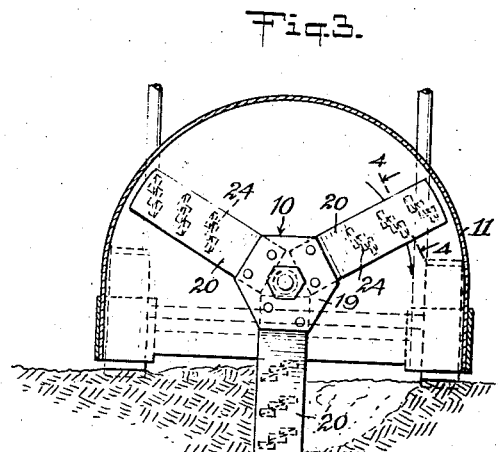
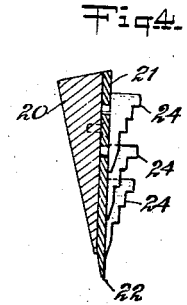
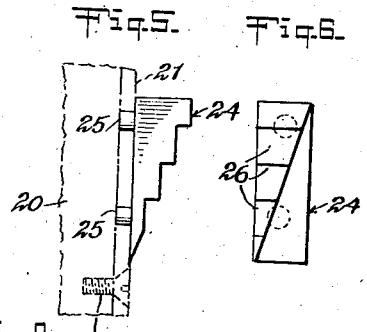
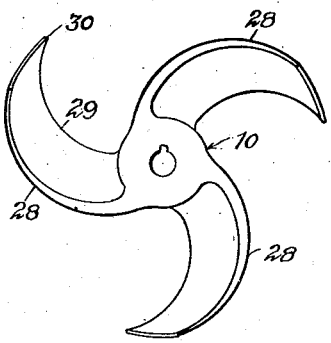
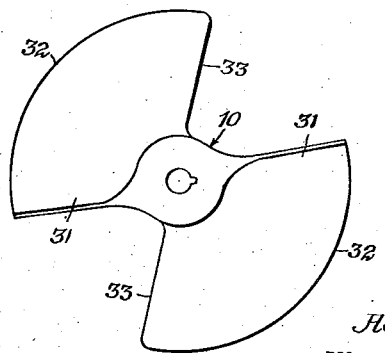
INVENTOR.
Adam G. Mahler Patented Aug. 15, 1944

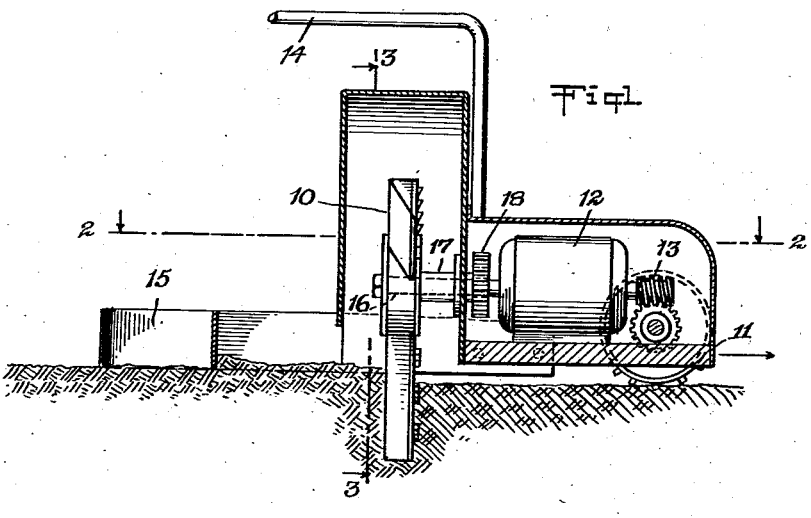
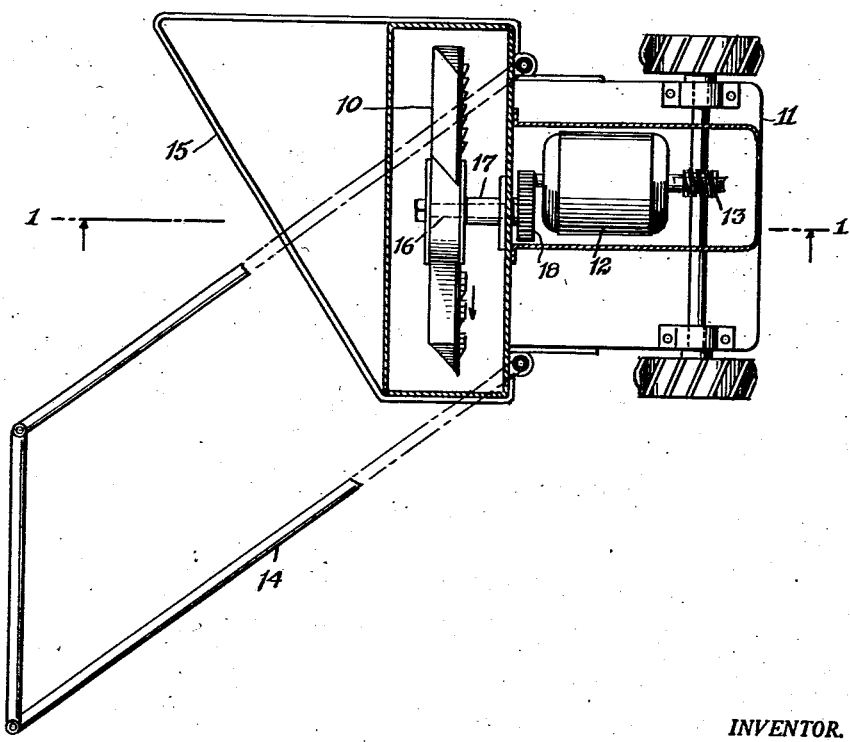

2,356,072

UNITED STATES PATENT OFFICE 2,356,072

GROUND PULVERIZER

Adam G. Mahler, New York, N. Y.

Application May 22, 1943, Serial No. 487,988

3 Claims. (Cl. 97—38)

This invention relates to a soil or ground pulverizer.

The principal object of the invention is the provision of an improved device for tilling or cultivating the soil or ground by pulverizing the same, and chawing roots, and mixing grass and fertilizer, preparatory to planting in order to increase the crops.

A further object is the provision of a device of the indicated character having improved tillers for the stated purpose which may be operated by hand or by power driven.

The nature of the invention and its distinguishing features and advantages will appear when the following specification is read in connection with the accompanying drawings, in which:

Fig. 1 is a longitudinal sectional view of a machine embodying the features of the invention, the section being taken on the line 1—1 of Fig. 2.

Fig. 2 is a sectional top plan view, the section being taken on the line 2—2 of Fig. 1.

Fig. 3 is a transverse sectional view taken on the line 3—3 of Fig. 1.

Fig. 4 is an enlarged detail sectional view taken on the line 4—4 of Fig. 3.

Fig. 5 is a profile view showing a portion of a tiller and root chawer.

Fig. 6 is a side view of the chawing attachment.

Figs. 7, 8 and 9 show other forms of tillers.

Referring now to Figs. 1, 2 and 3 of the drawings it will be apparent a soil cultivating element 10 is mounted for operation on a wheeled truck 11 driven by an electric motor 12 through the intervention of reducing gearing 13. The element 10 is disposed to operate across the path of travel of the truck. A handle 14 swingable to a position on either side of the truck serves for guiding the truck and the operator is able to walk to one side of the cultivated path to avoid trampling the freshly turned soil. A scraper 15 on the rear of the truck levels the top of the soil after it has been pulverized.

The tiller 10 is mounted on a shaft 16 supported by a bearing 17 on the frame of the truck and through the intervention of gearing 18 between the shaft 16 and the motor shaft, the element 10 is rotated by the motor. Current for the motor may be conducted thereto from a suitable source by a cord. The device is suitable for tilling or cultivating the soil of victory gardens or small acreage.

The tiller 10 consists of a hub 19 having radial blades 20, there being three in the present instance. Each blade is triangular or wedge shape in cross section as shown most clearly in Fig. 4. A plate 21 having a sharp cutting edge 22 is detachably secured to each blade by screws 23 or the like. The cutting edge 22 parallels the forward apex edge of the blade. A plurality of chawers 24 are secured to the plate 21 by rivets 25 or the like. The chawers 24 are arranged in groups of three and those in each group are out of line in the present instance. Each chawer 24 consists of a block of metal having a stepped formation to provide serrations or teeth 26. The stepped formation is triangular so that the leading tooth is triangular and the others are progressively larger and quadrilateral. Each tooth 26 therefore provides at least three cutting edges. The blades 20 with their cutters 21 pulverize the soil or ground aided by the chawers 24, which latter also effectively grind or cut roots and the like. The tiller 10 having the aforesaid features also cuts grass and mixes the same together with any fertilizer spread on the ground.

In Fig. 7 there is shown a tiller 10 having plow share blades 27. In Fig. 8 the blades 28 are longitudinally curved with a cutting edge 29 and a point 30. In Fig. 9 the tiller has blades 31 arranged spirally and having curved and straight cutting edges 32 and 33 respectively. These tillers are made of heavy steel wrought or cast.

From the foregoing it will be apparent there has been described a simple and practical device for attaining the objects of the invention.

I claim:

1. A tilling device comprising a hub, radial blades on said hub, each blade being triangular in cross section, and root chawing teeth on the side of each of said blades, said teeth being arranged in groups and each group consisting of a stepped formation in which the leading tooth is triangular and the others are progressively larger and quadrilateral.

2. A tilling device comprising a hub, radial blades on said hub, each blade being triangular in cross section, and a group of chawing elements arranged on the side of each of said blades, said elements being staggered with respect to each other, and each of said elements consisting of a stepped formation having teeth and the leading tooth being triangular and the others being progressively larger and quadrilateral.

3. A soil tiller adapted to travel on the surface of the ground, including a rotary tilling device comprising a hub, radial blades on said hub, each blade being triangular in cross section, a plate detachably secured to each of said blades, said plate having a sharp cutting edge paralleling the forward apex edge of the blade, and a group of elements each consisting of root chawing teeth arranged on the side of each plate, and said elements being staggered with respect to each other.

ADAM G. MAHLER.